United States Patent
Schwartz et al.

(10) Patent No.: US 9,275,452 B2
(45) Date of Patent: Mar. 1, 2016

(54) METHOD AND SYSTEM FOR AUTOMATICALLY DETERMINING COMPLIANCE OF CROSS SECTIONAL IMAGING SCANS WITH A PREDETERMINED PROTOCOL

(75) Inventors: Lawrence H. Schwartz, New York, NY (US); Yongqiang Tan, Forest hills, NY (US); Binsheng Zhao, Forest Hills, NY (US)

(73) Assignee: The Trustees of Columbia University in the City of New York, New York, NY (US)

( * ) Notice: Subject to any disclaimer, the term of this patent is extended or adjusted under 35 U.S.C. 154(b) by 268 days.

(21) Appl. No.: 14/005,544

(22) PCT Filed: Mar. 15, 2012

(86) PCT No.: PCT/US2012/029296
§ 371 (c)(1),
(2), (4) Date: Oct. 7, 2013

(87) PCT Pub. No.: WO2012/125867
PCT Pub. Date: Sep. 20, 2012

(65) Prior Publication Data
US 2014/0029828 A1    Jan. 30, 2014

Related U.S. Application Data

(60) Provisional application No. 61/453,024, filed on Mar. 15, 2011, provisional application No. 61/453,030, filed on Mar. 15, 2011.

(51) Int. Cl.
*G06K 9/00* (2006.01)
*G06T 7/00* (2006.01)
*G06K 9/03* (2006.01)
*G06T 11/00* (2006.01)

(52) U.S. Cl.
CPC .............. *G06T 7/0012* (2013.01); *G06K 9/036* (2013.01); *G06T 11/008* (2013.01)

(58) Field of Classification Search
None
See application file for complete search history.

(56) References Cited

U.S. PATENT DOCUMENTS

| 8,226,560 B2 * | 7/2012 | Arai et al. ..................... 600/443 |
| 8,244,015 B2 * | 8/2012 | Sirohey et al. ................ 382/130 |
| 2003/0108149 A1 | 6/2003 | Tsuyuki |
| 2007/0010743 A1 * | 1/2007 | Arai .............................. 600/443 |

(Continued)

OTHER PUBLICATIONS

ISA/US, "International Search Report and Written Opinion for the corresponding PCT application #PCT/US 12/29296", Jul. 13, 2012.

*Primary Examiner* — Tahmina Ansari
(74) *Attorney, Agent, or Firm* — Eugene J. Molinelli; Beusse Wolter Sanks & Maire PLLC

(57) ABSTRACT

A method of verifying compliance of a cross sectional imaging scan of a subject is provided, which includes determining one or more body volumes covered by the cross sectional imaging scan, and for each of the determined one or more body volumes, locating a presence of at least a portion of one or more internal organs of the subject encompassed in a corresponding determined volume, thereby verifying whether the cross sectional imaging scan is compliant with predetermined criteria. The predetermined criteria can be body coverage criteria for a scan of one or more body regions of the subject. Additionally, a method for verifying whether an image series of a cross sectional imaging scan is performed with contrast is provided.

26 Claims, 9 Drawing Sheets

(56) References Cited

U.S. PATENT DOCUMENTS

2009/0161927 A1  6/2009  Mori et al.
2010/0135561 A1* 6/2010  Moulik .................. 382/131
2010/0284590 A1* 11/2010 Peng et al. ............. 382/128

* cited by examiner

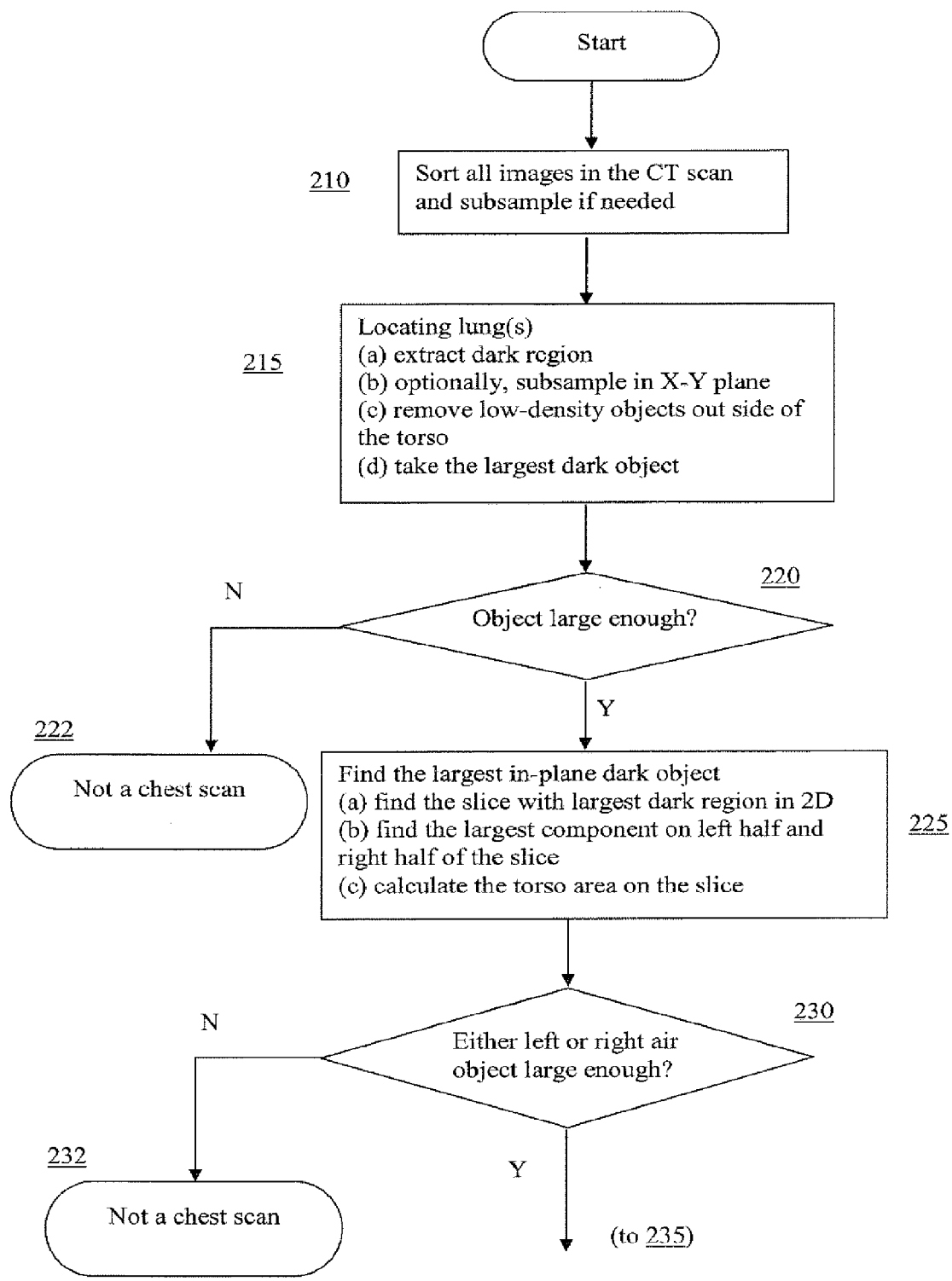
FIG. 2 (To be continued)

(to be continued)

(continued, part 2)

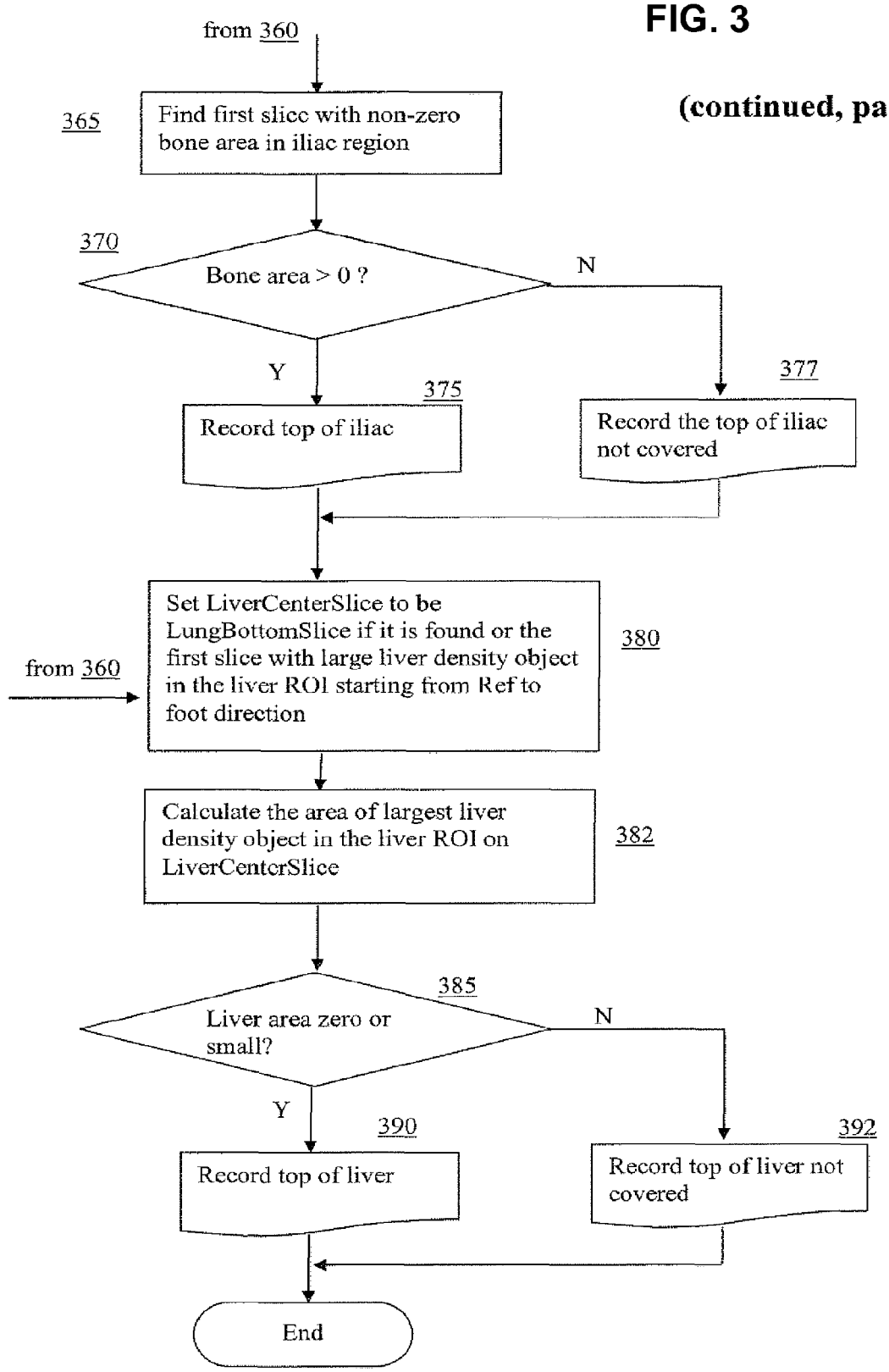
FIG. 3 (continued, part 3)

(To be continued)

Anterior "peel" region of interest

Posterior region of interest

METHOD AND SYSTEM FOR AUTOMATICALLY DETERMINING COMPLIANCE OF CROSS SECTIONAL IMAGING SCANS WITH A PREDETERMINED PROTOCOL

CROSS-REFERENCE TO RELATED APPLICATIONS

This application claims priority to U.S. Provisional Application Nos. 61/453,024 and 61/453,030, each of which was filed on Mar. 15, 2011, and the disclosure of each of which is incorporated herein by reference in its entirety.

This application further claims priority to Patent Cooperation Treaty application number PCT/US2012/029296 filed Mar. 15, 2012 the disclosure of which is incorporated herein by reference in its entirety.

BACKGROUND

Medical imaging has a significant role in diagnosis, treatment planning, and treatment response assessment. As such, both the quality of the images obtained from imaging methods, and ensuring compliance of the images with appropriate protocols, is important in clinical practice. In particular, imaging endpoints can be incorporated into clinical trials to help accelerate developments of new drugs. In multicenter clinical trials, images acquired from different centers are sent to a centralized data management location for storage and analysis. Compliance of the imaging data with an imaging protocol defined for a particular analysis can be important for the success of the trial.

Cross sectional imaging is an imaging technique which produces a large series of two-dimensional images of a subject, e.g., a human subject. Via digital image processing, the series of two dimensional images produced by cross sectional imaging can be used to construct three-dimensional "objects" to demonstrate various internal structures of the subject, e.g., organs, tissue, blood, etc., and particular conditions of the subject, such as tumor, hemorrhage, trauma, etc. Examples of cross sectional imaging techniques include computerized tomography (CT), magnetic resonance imaging (MRI), positron emission tomography, SPECT scanning, ultrasonography, among others.

In clinical practice, cross sectional imaging scans, such as CT scans, are used in the screening, diagnosing and following up with patients, generating a large of amount of imaging data. In clinical trials, cross sectional imaging scans for many patients or volunteers can be performed in accordance with a prescribed protocol(s). Ensuring that the scans cover the organ of interest and/or are performed with the correct contrast can be beneficial in the quality control of the clinical trials, as the number of patients enrolled in a trial can be limited and every scan valuable. It can be desirable to inform the operator timely if any of body part of interest is not covered in a study (scan), or if the contrast is incorrect in the study. Manual examination of every scan can be time-consuming and impractical. Therefore, there exists a need for a computer aided technique to identify such and/or other errors, and to improve the quality control of CT scans, and the quality control of cross sectional imaging scans in general.

SUMMARY

In accordance with one aspect of the disclosed subject matter, a method of verifying compliance of a cross sectional imaging scan of a subject, the cross sectional imaging scan including one or more series of images is provided. The method includes: determining, using one or more computer processors, one or more body volumes covered by a cross sectional imaging scan, wherein each of the one or more body volumes covers a continuous region along a body axis of the subject; and for each of the determined one or more body volumes, locating, using one or more computer processors, a presence of at least a portion of one or more internal organs of the subject encompassed in a corresponding determined volume, thereby verifying whether the cross sectional imaging scan is compliant with predetermined criteria.

In some embodiments, determining the one or more body volumes can comprise arranging the one or more series of images according to the axial location of each of the one or more series of images with respect to the body of the subject. Verifying the presence of at least a portion of one or more internal organs for a body volume can comprise selecting a working set of images for the body volume based on the one or more series of images included in the cross sectional imaging scan. The working set of images can be generated by subsampling the one or more series of images according to predetermined axial locations in the body volume.

In some embodiments, the predetermined criteria can be for a scan of one or more body regions of the subject selected from the group consisting of a chest scan, an abdomen scan, a pelvis scan, a chest-abdomen scan, an abdomen-pelvis scan, and a chest-abdomen-pelvis scan. When there is more than one body volume determined, the locating of the presence of at least a portion of one or more internal organs of the subject can be performed according to the relative axial positions of the body volumes, with the volume nearest the head of the subject first.

The predetermined criteria can include body coverage criteria for a chest scan, under which the one or more internal organs include a lung of the subject, and locating the presence of at least a portion of a lung for a determined body volume can include identifying the largest lung-intensity object (e.g., a dark object as further described below in connection with a CT scan) as the lung in the determined body volume. Locating the presence of at least a portion of the lung can also include detecting the presence and/or position of the apex of the lung as an upper boundary and the bottom of the lung as a lower boundary, and such detecting can be based on the selected working set of images for the body volume. Detecting the presence and/or position of the apex of the lung can be based on the axial position of the first image in the working set of images that has a lung-intensity object and the size of the lung-intensity object in the area of the image that excludes the trachea of the subject. Detecting the presence and/or position of the bottom of the lung can be based on the axial position of the last image in the working set of images having a lung-intensity object as compared with the last image in the working set of images of the body volume encompassing the lung.

The predetermined criteria can include body coverage criteria for an abdomen scan, under which the one or more internal organs include the liver of the subject, and locating the presence of at least a portion of the liver in the determined body volume can include detecting the presence and/or position of the top of the liver as an upper boundary, and such detecting can be based on the selected working set of images for the body volume. Locating the presence of at least a portion of the liver can include detecting one of the top of the iliac crest or the bottom of the chest ribs as a lower boundary.

The predetermined criteria can include body coverage criteria for a pelvis scan, under which the top of the iliac crest can be selected as an upper boundary and the bottom of pubic symphysis can be selected as a lower boundary. Locating the presence of the top of the iliac crest can include locating a topmost slice of the left iliac crest and the right iliac crest. Locating the bottom of pubic symphysis can include locating the tip of coccyx followed by locating four bones (four connected components with bone density) on one slice in the body volume with similar size from the tip of coccyx toward the foot direction of the subject.

In another aspect, the disclosed subject matter provides a method of determining whether a series of images of the cross sectional imaging scan is contrast enhanced or not. Such a method can be used independently, or further to the method described above relating to verifying the compliance of the cross sectional imaging scan with predetermined body coverage criteria. In the latter case, the series of images can be first checked for compliance regarding whether it covers the body region of interest. The determining of contrast can include generating a tubular volume approximating a portion of the descending aorta of the subject falling within a predefined volume of interest, and comparing an average pixel density of the tubular volume with a predetermined threshold. When the at least one series of images included in the cross sectional imaging scan is determined to cover the chest and/or the abdomen, the generating of the tubular volume can include locating a center line of the descending aorta from the at least one series of the cross sectional imaging images within a predefined volume of interest for the descending aorta of the subject, and generating the tubular volume by dilating the located center line of the descending aorta with a predefined structuring element.

In some embodiments, locating the center line of the descending aorta can include treating a volume of interest (VOI) encompassing the portion of the descending aorta as a directed graph including voxels in the VOI as vertices and edges between neighboring voxels. Each edge of the directed graph is assigned a cost, and the center line of the descending aorta can be determined to be the path from the first slice in the volume of interest to the last slice in the volume of interest that has the smallest accumulative edge cost. When at least one series of images of the CT scan is determined to cover the abdomen and performed with contrast, the method can further include determining whether the at least one series of images is at arterial or portal venous phase based on comparing the average pixel density of the descending aorta and the average pixel density of the liver parenchyma of the subject.

In another aspect, the disclosed subject matter provides a system for determining compliance of a cross sectional imaging scan of a subject, comprising a processing arrangement including one or more computer processors, the processing arrangement configured to perform any one or more of embodiments of the above-described methods.

DESCRIPTION

Figure 1:
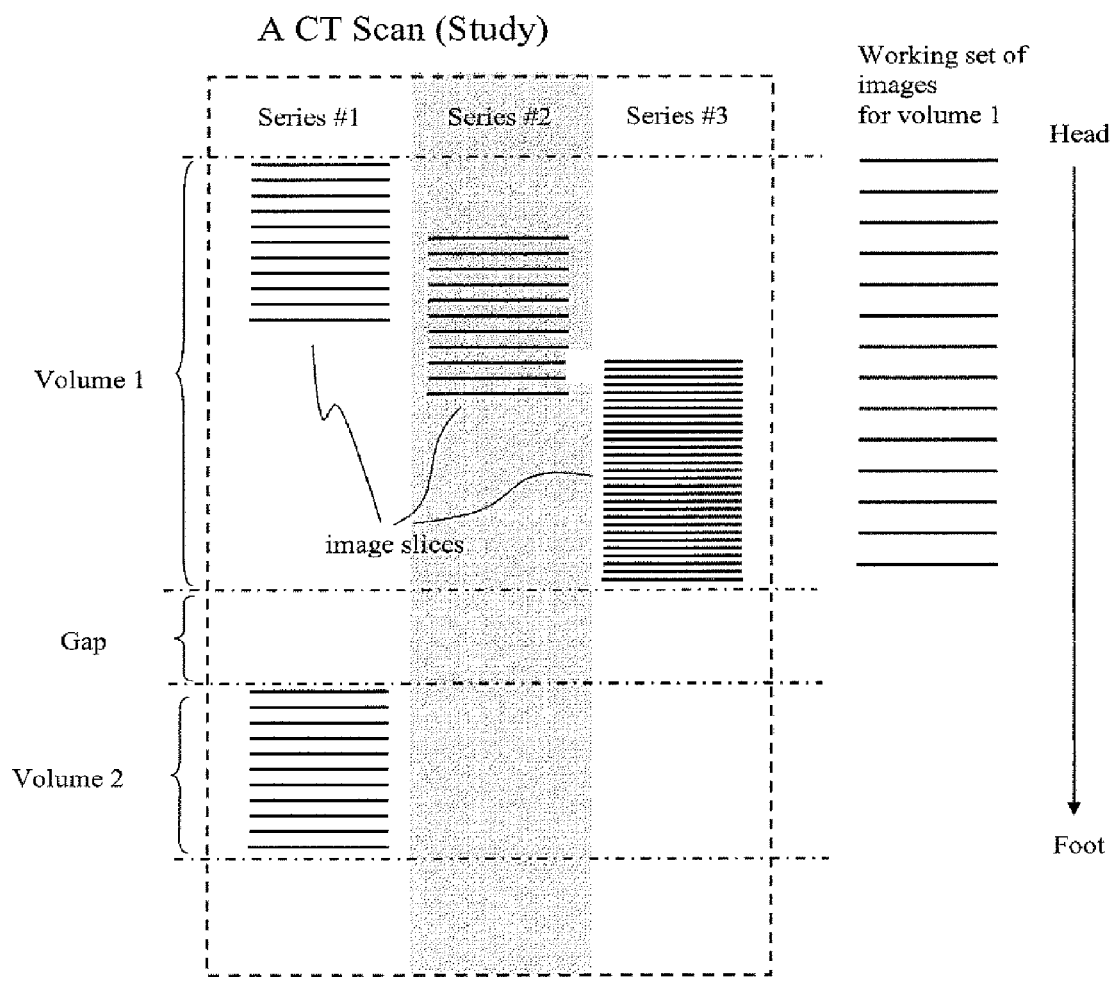
FIG. 1 is a schematic diagram illustrating series of images in a cross sectional imaging scan, according to the disclosed subject matter.

The disclosed subject matter relates to computer aided quality assurance for cross sectional imaging, e.g., CT scans. In exemplary embodiments, the disclosed subject matter provides computer implemented methods for evaluating the compliance of cross sectional imaging study with predetermined criteria for the study. The predetermined criteria can be protocols for the scans of certain body regions of interest. The protocols can be regarding whether the cross sectional imaging scan (or multiple scans) covers the body part (or region) of interest of the subject, and/or whether a cross sectional imaging scan, or part thereof, is performed with contrast, without contrast, or both. In the following, for illustration and not limitation, various embodiments of the methods and system of the disclosed subject matter are described in connection with CT scans. It is appreciated that the methods described herein can also be applicable in other cross sectional imaging techniques and systems.

In some embodiments, the disclosed subject matter provides techniques for verifying compliance of a cross sectional imaging scan regarding body coverage. A cross sectional imaging scan, such as a CT scan, can include one or more series of images. The cross sectional imaging scan can be evaluated to determine one or more body volumes covered by the images contained in the cross sectional imaging scan, where each of the body volumes covers a continuous region along the body axis of the subject. For each of the body volumes determined, a presence of at least a portion of one or more internal organs of the subject is located. Based on the presence or absence of the at least a portion of the one or more internal organs, the cross sectional imaging scan can be compliant, or non-compliant with predetermined body coverage criteria for a scan of one or more body regions of the subject. The predetermined criteria can be regarding a chest scan, an abdomen scan, a pelvis scan, or combinations thereof, e.g., a chest-and-abdomen scan, an abdomen-and-pelvis scan, or a chest-and-abdomen-and-pelvis scan. The techniques are further illustrated below in connection with the Figures and various embodiments and examples in the application. For convenience, a method as applied to different body regions or body coverage protocols are referred to herein as a compliance check for a scan(s) of such body regions, for example, a compliance check for a chest scan.

As disclosed herein, the predetermined body coverage criteria for a cross sectional imaging scan can include whether the cross sectional imaging scan covers a body region in an axial direction (i.e., from the head to foot of the subject) between a predefined lower boundary and a predefined upper boundary for such a cross sectional imaging scan. If the original images obtained from the cross sectional imaging are coronal or sagittal images, they can be transformed to axial images by resampling. The upper and lower boundary for the body region can be defined by the location of a portion of pre-selected internal organs. For example, the criteria for a compliant chest cross sectional imaging scan can include that the scan covers the body part from the apex of the lung to the bottom of the lung. Similarly, the criteria for a compliant abdomen scan can include that the scan covers the body part from the top of the liver to the top of the iliac crest. Alternatively, the lower boundary of an abdomen scan can be chosen as the bottom of the check ribs. A proper pelvis scan can be defined as the one that covers the body part from the top of iliac crest as the upper boundary to the bottom of pubic symphysis as the lower boundary.

As used herein, a cross sectional imaging scan can include a series of images during a scan session of the subject during which the subject is moved relative to the scanner, continuously or non-continuously, along the scan axis in a given direction. For certain scan sessions, e.g., where a scan session has covered a body region, and is suspended at a body position to allow circulation of a contrast agent to the next body region to be scanned, the scanner can be moved slightly backward to ensure the next body region to be covered by the resumed scan session will not have a gap from the previously covered body region. In such circumstances, the series of images can include (slightly overlapping) sub-series that cover different body regions. For axial scans, the scan axis also coincides with the body axis of the subject. Such a series of images (or image slices, or slices) each indicate a different and unique axial position along the subject's body. A cross sectional imaging scan can also include more than one scan session, that is, it can include more than a series of images. For example, in such a cross sectional imaging scan, a first scan session can cover the subject's chest region, and a second session can cover part of the chest region of the subject, or cover a different body region. As such, different series of images obtained in a cross sectional imaging scan can overlap in the body region they cover, or be separated by a gap.

A cross sectional imaging scan herein can also be referred to as a study. A single series of images in a cross sectional imaging scan are usually evenly spaced along the scan axis, e.g., 1 mm between every two axially adjacent images in the series. Each of the images in the series has information for a volume slice having a thickness of the spacing between the images. Thus, whether the one or more series of images constitute one or more body volumes can be determined based on the physical positions of the images in the cross sectional imaging scan and the thickness of the volume slices represented by each of the images.

For example and referring to FIG. 1, if more than one series of images are included in a cross sectional imaging scan (using a CT scan as an example), the different series (series #1, #2, and #3 as shown) can be first arranged or sorted according to their physical locations. Based on the physical positions and slice thickness of the images in each series of images, two volumes (volume 1 and volume 2) are determined to be present in the CT scan illustrated in FIG. 1. Volume 1 can be viewed as a union or splice of the upper portion of the series #1 with the series #2 and #3. Volume 1 and volume 2 are separated by a gap portion which is not covered by any image slices in any of the series.

As used herein, a higher (or upper) slice or body volume indicates a slice or body volume that is closer to the head of the subject. Unless otherwise noted, the reference to "first image" (or first slice) in a set of images means the image closet to the head of the subject amongst the set of images, and "last image" (or last slice) in a set of images means the image farthest to the head of the subject amongst the set of images. It is further noted that since each image in a series of images in a cross sectional imaging scan contains information for the volume slice having a thickness of the spacing between the images in a series, when the term "slice" is used, it can also refer to an image located at the slice.

The coordinate system used herein can follow the conventional system that the top left corner of an image is the origin (0, 0, 0). In x-y plane, x axis increases from left to right and y axis increases from top to bottom. Along z axial direction, z axis increases from top (head) to bottom (toes). As far as the anatomical organs are concerned, the right side of a body part is the left side of the image.

If it is determined there are more body volumes covered by the cross sectional imaging scan, the procedure can evaluate the compliance of the cross sectional imaging scan by detecting the presence or absence of at least a portion of selected internal organ(s) of the subject according to the predetermined criteria within each of the multiple volumes. Although the multiple body volumes can be evaluated in an arbitrary order, for purpose of efficiency, they can be preferably evaluated from a head-to-foot direction, i.e., with the volume nearest the subject's head evaluated first. In this manner, certain information gathered from the previously evaluated higher volume can be utilized in the evaluation of a lower volume. It is noted that each compliance check for the coverage of a selected body region(s) is performed within each of the body volumes determined, and not across multiple body volumes. If none of the determined body volumes in a cross sectional imaging scan completely encompass the portion of organ(s) defined for a compliant scan of the relevant body region(s), then the cross sectional imaging scan can be deemed as not compliant with the predetermined criteria (or protocol) of such a scan.

For evaluation of body coverage in each of the body volumes, the image series within the volumes can be pre-processed. For example, if there is a single series of images (e.g., Series #1 as shown in FIG. 1) in a cross sectional imaging scan, a subsampling of the original series of images can be performed to reduce the number of images used in subsequent evaluation procedure. For example, if the original series of images has a slice thickness of 1 mm, by the subsampling one out of every five slices can be selected to generate a working set of images (e.g., the working set has a slice interval of 5 mm) for the volume. Other subsampling techniques can also be applied to the single series of images, as explained below in connection with multiple series of images. Note that the number of working set of images for the volume is not necessarily fewer than the number of images in the original series. Rather, the original series of images can be used directly as a working set of images if needed or desired.

Similarly, when there are multiple series of images in a cross sectional imaging scan (as shown in FIG. 1), for a body volume including the multiple image series, subsampling can be performed over the multiple image series. As described earlier, images in each series can be arranged or ordered based on their physical locations in the scan in a descending (or ascending) order. In the subsampling, a working set of images can be selected or generated from the original multiple series to fill the body volume. For example, to generate an image slice in the working set that has a given axial location in the body volume, an image (or images) can be used from the different series based on one or more of the following: (1) selecting the image whose location is closest to the slice location in the body volume; (2) selecting the series with the thinnest slice thickness or the largest number of images; and (3) re-sampling from the series that is close to the desired slice interval. The re-sampling can be based on nearest neighbor or other interpolation methods such as bi-linear interpolation. In case that the multiple series have different pixel spacing, all slices can be re-sampled, for example, to the same (coarsest) pixel spacing. Other subsampling techniques can also be used. After the subsampling, the working set sequence of images that fill the body volume (as illustrated in FIG. 1) can be used in subsequent procedure for body coverage evaluation in the body volume. Unless otherwise noted, when the term "slice" is used hereinafter, it refers to an image slice of the working set of images within the relevant body volume at issue.

Figure 2:
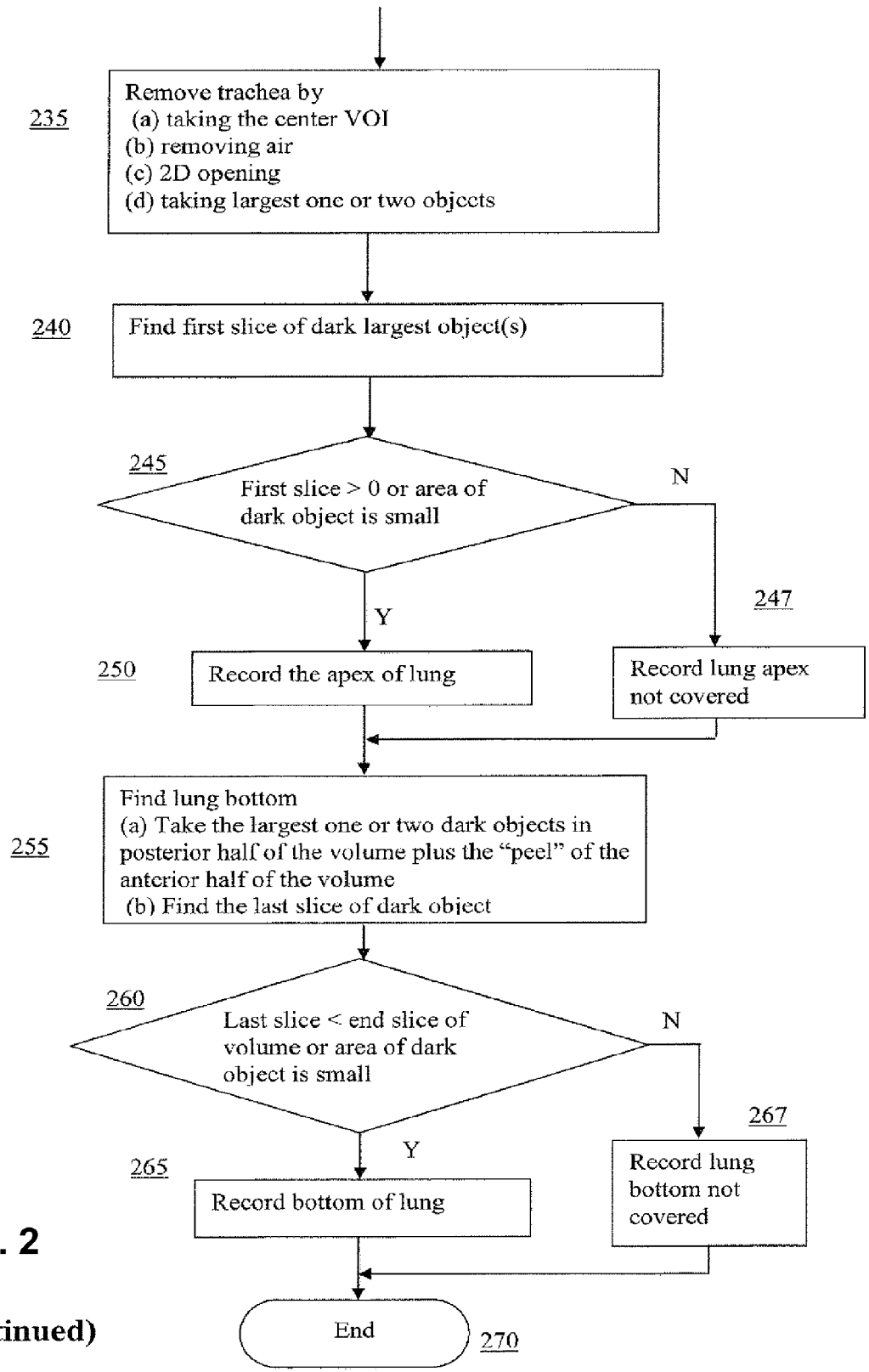
FIG. 2 is a flow chart illustrating a procedure for a compliance check for a chest scan according to some embodiments of the disclosed subject matter.

According to some embodiments of the disclosed techniques, a procedure for checking whether a cross sectional imaging scan is compliant with a chest scan protocol is described below in connection with FIG. 2. A CT scan is used as an example of the cross sectional imaging scan. The data from a CT scan are obtained at 210 (the raw series of images can be in DICOM format). One or more body volumes can be determined according to the procedure outline above, which can include sorting of the original series of images. The original series of images can be further subsampled as necessary to generate the working set of images for the one or more body volumes as described above. The following exemplary procedure can be performed within one of such the body volumes determined.

A chest scan can be defined to cover the apex and the bottom of the lung(s). More strict criteria, e.g., certain amount (e.g., 10 mm) above the apex towards the head direction can also be used as the upper boundary. A lung (or lungs) of the subject can be determined (215) as follows. Since the lung is the largest low density organ in a CT scan if it is present, a pre-defined threshold (e.g., −500 Hounsfield Unit (HU)) can be applied to the body volume to extract the regions whose voxels are lower than this threshold. (In other cross sectional imaging techniques, the lung can be identified in a similar manner as described herein by selecting an appropriate intensity threshold or an appropriate intensity range.) Subsampling can be performed on the extracted dark regions. Air outside the torso forms a connected component (or components) and can be removed. The torso on the center slice can be segmented by taking the largest object with densities greater than another threshold, e.g., −200 and holes inside the torso filled. Region(s) outside the torso on the center slice can be set as low density region(s), e.g., set to −1024 HU. The 3D connected components of the low density regions can then be labeled, and the low density region(s) outside of the torso can be removed. The largest component and the second largest component, e.g., if its size is at least 50% of that of the largest one, can be considered as candidates of the two lungs. For example, at 220, a test can check whether a remaining dark object (which is considered a candidate of a lung) is large enough (e.g., by a predetermined threshold for the height of the dark object or for the total number of voxels in the dark object). If the answer is negative (at 222), the procedure can exit and report that the body volume does not include a compliant chest scan. Otherwise, the dark object can be further analyzed. For example, at 225, a slice with the largest dark region in 2D in the object is located, and the largest dark component on both the left half and the right half of the slice is identified. The torso area on the slice is then calculated. If neither of the left or right component is large enough (at 230), for example, having an area exceeding a given fraction of the area of the torso on the slice, the body volume can be determined as not including a compliant chest scan (at 232). Otherwise, the object corresponding to the component can be determined to be a lung.

If a large dark (or low-density) object is found and determined to be a lung, as previously discussed, the apex of the lung can be further located. To detect the apex of the lung(s), the low density trachea can be removed from the object (at 235). To determine a volume of interest (VOI) containing the trachea, the slice that has the largest number of the object pixels (maxPixels) can be located and named as MaxSlice. From the MaxSlice towards the direction of the head, the first slice having a pixel number of maxPixels/2 or smaller can be defined as HalfMaxSlice. If all slices above the MaxSlice contain more than maxPixels/2 pixels, the lung apex can be determined as not covered. Otherwise, a cubic VOI in the center part of the torso, where the trachea is located, can be defined from the upper most slice of the body volume to HalfMaxSlice. The region(s) that has densities lower than a certain threshold, e.g., −900 HU and volume(s) larger than a certain threshold, e.g., 100 voxels (indicating trachea) can be removed, small holes (e.g., less than 32 pixels) can be filled, and morphological opening with a ball of the radius that is, e.g., about 5 times of the pixel spacing in the axial plane can be applied. Only the largest component and the second largest one, if it exists and is at least 20 percent of the size of the largest component, now remain. The first slice of the remaining dark object(s) can be located (at 240). If the number of the object pixels in the first slice of the remaining dark object(s) is large (e.g., greater than 50 pixels), and that the first slice of the dark object(s) is located at the first slice of the determined body volume (at 245), the lung apex can be determined as not found and thus the top of the chest is not covered (at 247), after which the procedure can either exit or proceed to checking the bottom of the lung (at 255); otherwise, the top of the chest can be deemed as covered and the lung apex can be determined to be the top slice that the lung(s) starts (at 250). The threshold of number of pixels on the highest slice of the dark object(s) can be considered a tolerance and can be selected to be a number other than 50. The larger the tolerance, the looser the criteria is and more cases will pass the examination. More strict criteria such as 5 mm or 10 mm above the apex of the lung as the top of the chest can also be used.

Figure 5:
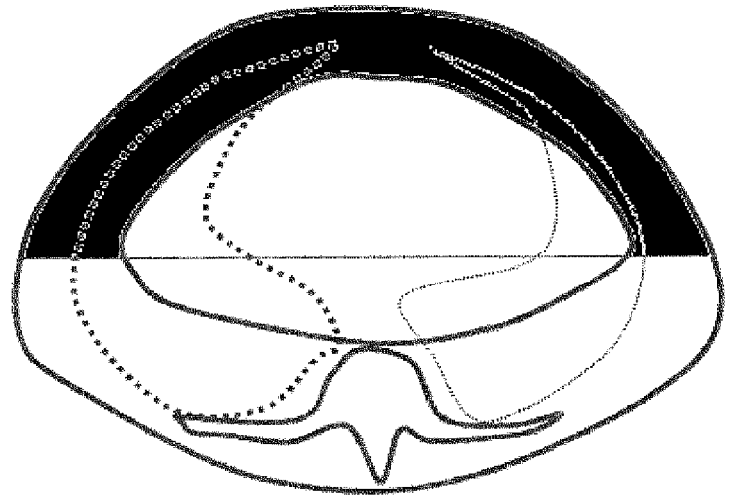
FIG. 5 is an illustration for volumes of interest for locating the bottom of the lung according to some embodiments of the disclosed subject matter.
Figure 5:
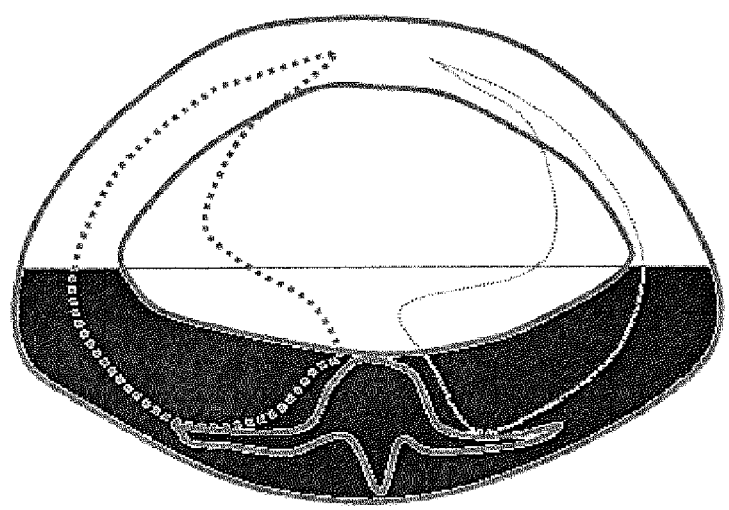

It can be the case that the posterior parts of the lungs reach deeper into the abdomen than the anterior parts do. Therefore, a VOI containing the posterior half of the lung plus the "peel" (within one-fourth of the radius of largest inscribed circle inside the torso (with skin and subcutaneous fat region removed)) of the anterior half of the lung from MaxSlice to the end of the volume can be studied (255). A half ellipse region is centered at the center of the torso whose semi-minor axis is from the center of the torso to the anterior of the spine (see FIG. 5, where the dark areas indicate the region of interest (ROI)). The last slice of lung can be the highest slice of the dark object in the anterior and posterior ROI from the MaxSlice to foot direction. If the last slice of the dark object is above the last slice of the body volume, or if the number of the object pixels in the last slice is small (e.g., less than 50 pixels) (at 260), then the bottom of the chest can be deemed as covered, and the bottom of the chest can be recorded as the last slice of the dark object where the number of lung pixels is not zero (at 265); otherwise, the bottom of the chest can be deemed as not covered in the body volume (267).

Figure 3:
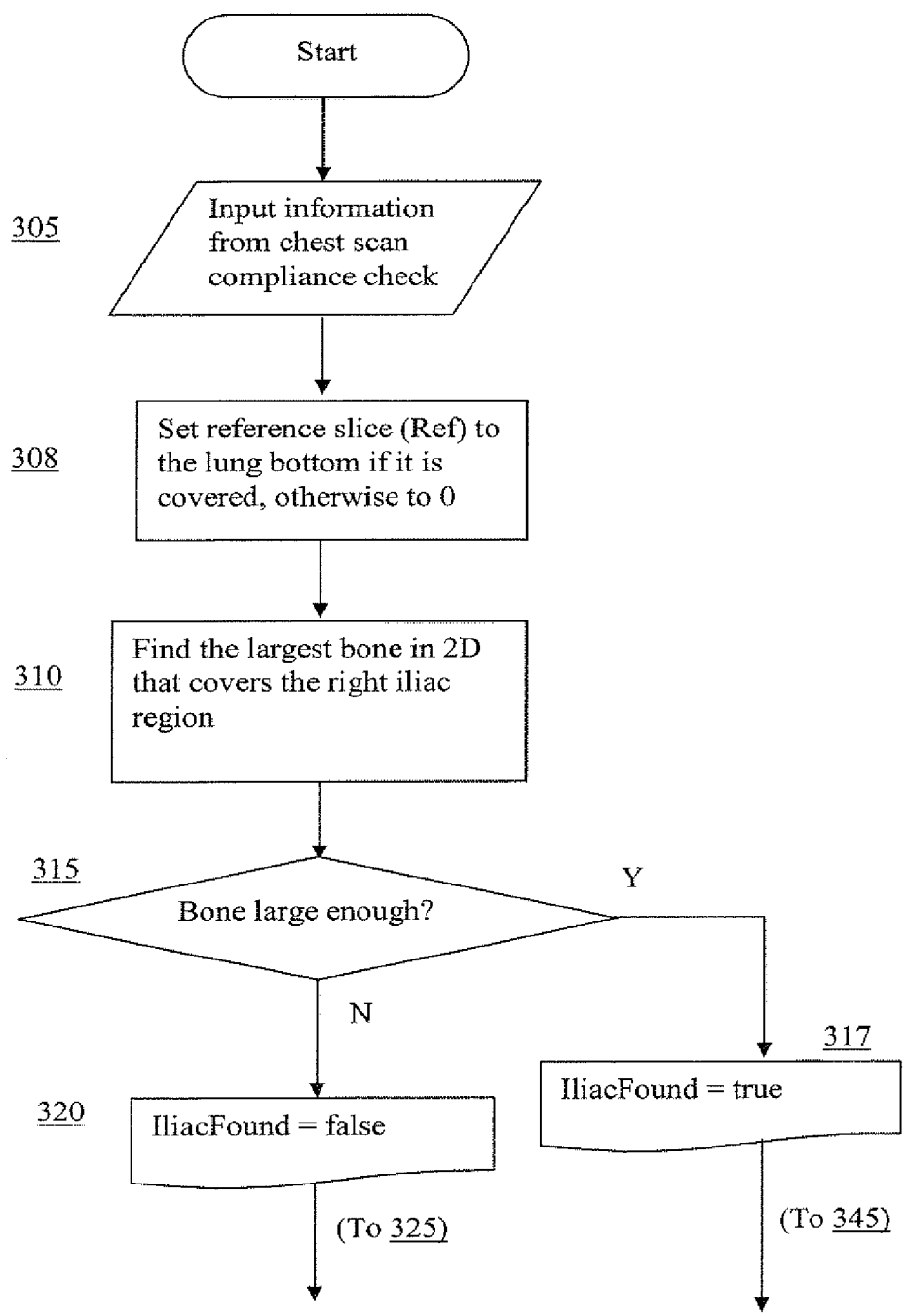
FIG. 3 is a flow chart illustrating a procedure for a compliance check for an abdomen scan according to some embodiments of the disclosed subject matter.
Figure 3:
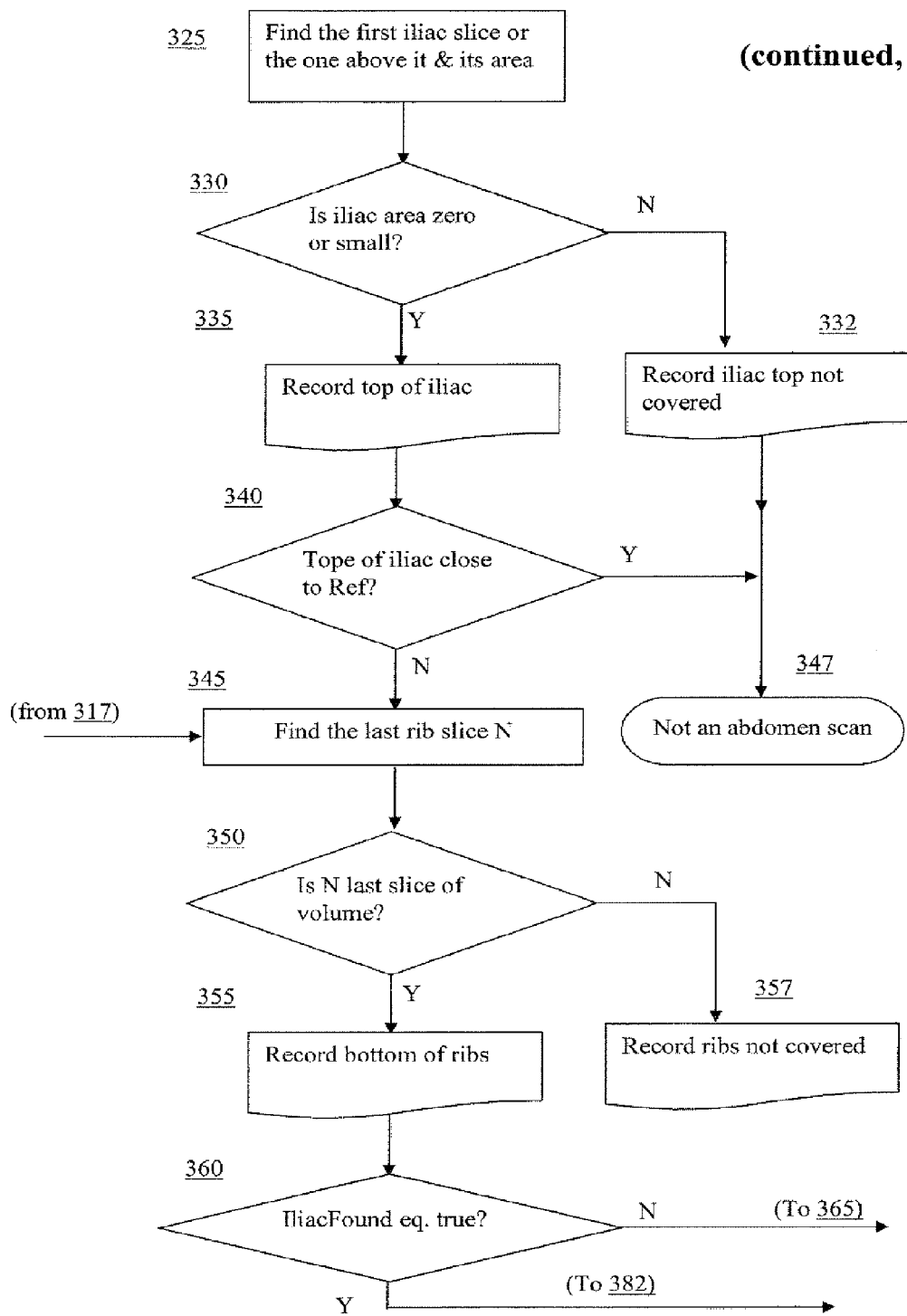

According to some embodiments of the disclosed techniques, a procedure for checking whether a cross sectional imaging scan is compliant with an abdomen scan protocol is described below in connection with FIG. 3. A CT scan is used as an example of the cross sectional imaging scan. A proper abdomen scan can be defined to cover the body region from the top of the liver as an upper boundary to the top of the iliac crest as a lower boundary. Alternatively, the lower boundary can be defined as the bottom of the lowest chest rib. Lung bottom lies between the top and the bottom of the abdomen. If the body volume is previously evaluated for the compliance with a chest scan, relevant information from such a prior evaluation can be input (at 305). The lung bottom can be found according to the procedure above, the last slice of the lung(s) can be set to be the reference slice to start the checking of the abdomen coverage; otherwise, the reference slice can be the first slice of the body volume (at 308).

The iliac has high density on CT and is V shaped, symmetrically located at the left and the right side of the body in the axial view. Two VOIs that contain the left and right iliacs (if they are present) from the reference slice to the last slice in the body volume can be determined. The two VOIs are two parallelepipeds that cover the left and right branch of the V shape at both sides of the spine. In each VOI, pixels having density higher than a predefined threshold (e.g. 200 HU) can be labeled and the largest connected component is extracted, which can be considered as the candidate iliac bone (at 310). If there is a slice both of whose left and right sides contain an object that has relatively large area (e.g. greater than 800 pixels) (at 315), the objects can be considered as iliac bones (at 317) and the slice can be called IliacFoundSlice. The iliac bones can be dilated and propagated to the next slice towards the head direction, serving as a mask in which iliac bones in the new slice are segmented (at 325). The top of the iliac can be determined as the slice before either left or right iliac just disappears in axial view, e.g., when the area approaches zero (at 330). The procedure can record top of the iliac if it is found (at 335), or exit and report that the volume does not include a compliant abdomen scan (at 347).

If the top of the iliac is found and it is close to the first slice in the body volume (e.g., less than 10 cm) (at 340), the body volume can be determined as not including an abdomen scan (but instead likely to be a pelvis scan), and the procedure can report that the volume does not include a compliant abdomen scan (at 347). Otherwise, the procedure can proceed as described below.

If the top of the iliac is found as previously discussed, the following can be optionally skipped. Otherwise (at 320), a VOI starting from the reference slice till the top of the iliac (if it is found), or the IliacFoundSlice (if it is found), or the last slice in the body volume can be exploited to further determine the lowest chest rib. To determine the position of the chest ribs, the posterior half of the torso can be used. A left rib mask can be defined as the region to the (image) right of a parabola from (xSpine+2R, ySpine+1.5R) to (xLeft, yCenter), where xSpine, ySpine and R are the center of the spine and the maximum inner-subscribed circle on the reference slice, and xLeft and yCenter are the left most and the center of the torso. A right rib mask can be defined in a similar way. Objects with densities higher than a predefined threshold (e.g., 200 HU) can be extracted. The masks can be applied to remove objects outside of them. The left (right) rib can be considered as the largest connected component in the left (right) mask. The last slice of the ribs can be determined (at 345). If the rib(s) is found on the last slice of the body volume (at 350), the procedure can report that the bottom of the abdomen is not covered in the body volume (at 357); otherwise the bottom of the ribs can be recorded (at 355).

If the ending of the lowest rib is found, and when the iliac bone was not previously located (at 360), the procedure can go on to search the top of the iliac slice by slice from the ending slice of the ribs toward the foot direction (at 365). The right iliac mask can be defined as a quadrilateral that covers the left branch (image coordinates) of the V shape to the right of the spine and the bottom one third of the torso, the left iliac mask can be defined similarly. If there are high density objects (e.g., pixel density greater than 200 HU and larger than 50 pixels) on a slice in both left and right iliac masks (at 370), these objects can be considered as iliac bones, and the slice can be considered as the top of the iliac and recorded (at 375). Otherwise, the procedure can record that the top of iliac is not covered (at 377).

Part of the liver can be segmented slice by slice from a middle slice of the abdomen (which will be referred to as LiverCenterSlice later) to the direction of the head until the liver is not found in a defined ROI or HalfMaxSlice is reached (at 382). The top of the liver appears to the right upper half of the torso in axial view and the heart lies in the middle of the torso. For each slice, a 2D liver mask can be defined to cover the right upper half of the torso with a circle located in the center removed. Specifically, the center of the spinal cord (xSpine, ySpine) and the radius of its maximum inscribed circle R, and the y coordinate of the top of the torso yTop can be obtained; two arcs can then be defined: one 145 degree arc centers at (xSpine, yTop+(ySpine+yTop)/2−R) with radius (ySpine−yTop)/2−R starting from (xSpine, yTop) to the image left direction, the other 90 degree arc centered at (xSpine, ySpine−2R) with radius (ySpine−yTop−2R) starting from (xSpine, yTop) to the image left direction; the mask can be defined as the region between the two arcs followed by morphologically opening, e.g., with a disk of a radius of 10 pixels.

If the bottom slice of the chest is found in previous steps, that slice can be named the LiverCenterSlice. If the bottom of the lung is not found, the procedure can first find a slice with a large object (e.g., the largest connected component with densities between 30 HU and 160 HU that is greater than 2048 pixels) in the mask from the reference slice to the direction of the toes, and name the slice the LiverCenterSlice. The procedure can segment the liver from the LiverCenterSlice toward the direction of the head to HalfMaxSlice (if it is detected) or to the first slice of the body volume, and stops if no liver is found in the ROI. The liver on the LiverCenterSlice can be segmented as the largest object in the liver mask with densities between two thresholds (e.g., 30 HU and 160 HU). In the next slice, the liver parenchyma can be segmented as the largest connected component in the intersection of the liver mask and a dilated region of the liver obtained in its previous slice. This process can stop when there is no (liver) object found in the liver mask or the pixel number of the liver object is small (e.g., less than 100 voxels) (at 385). The stopping slice can be deemed the top of the liver (or top of the abdomen) (at 390). If the top slice contains an object with more than a predetermined number of pixels, e.g., 100 pixels, the procedure can report that the top of the abdomen is not covered in the body volume (at 392).

Figure 4:
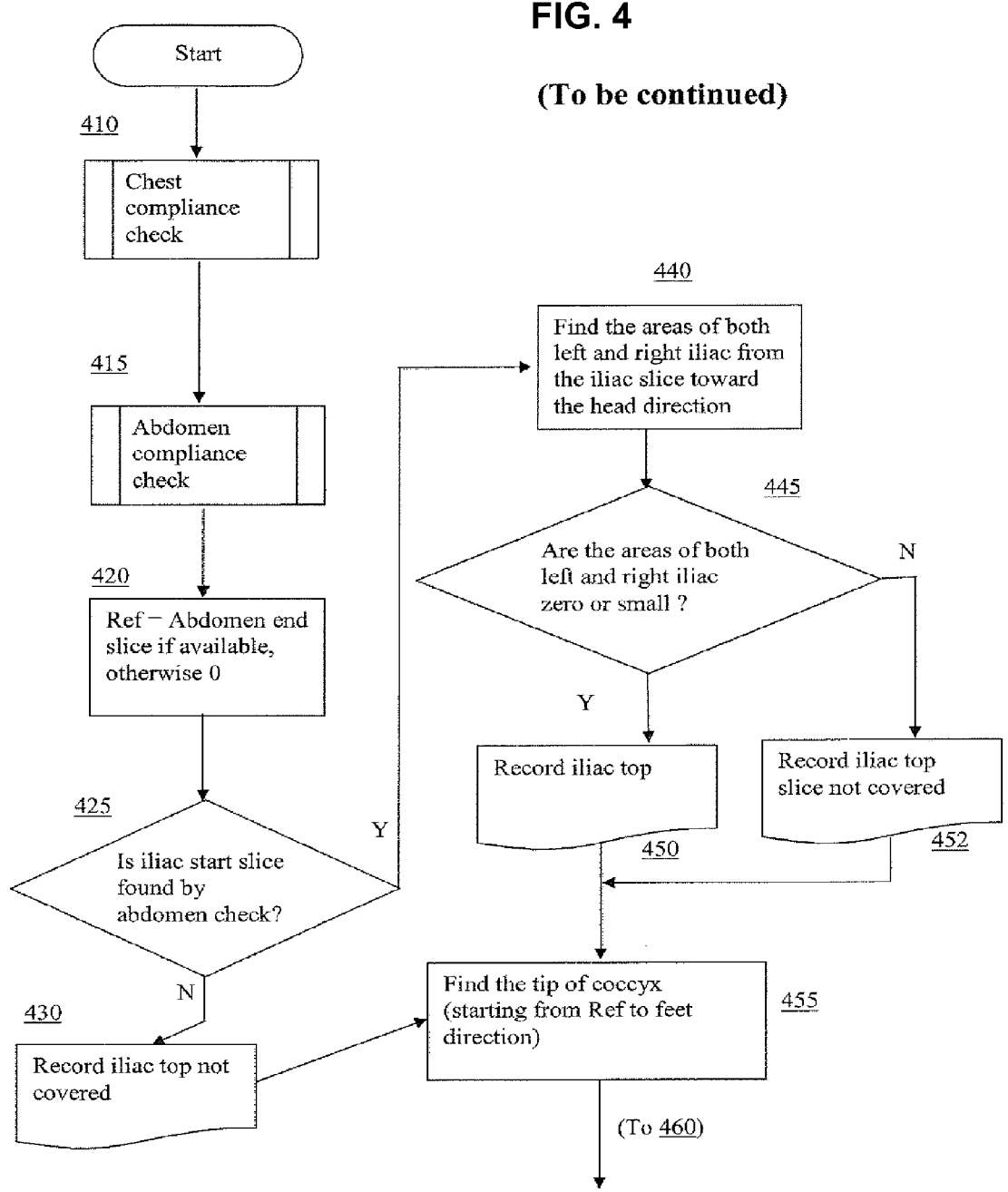
FIG. 4 is a flow chart illustrating a procedure for a compliance check for a pelvis chest scan according to some embodiments of the disclosed subject matter.
Figure 4:
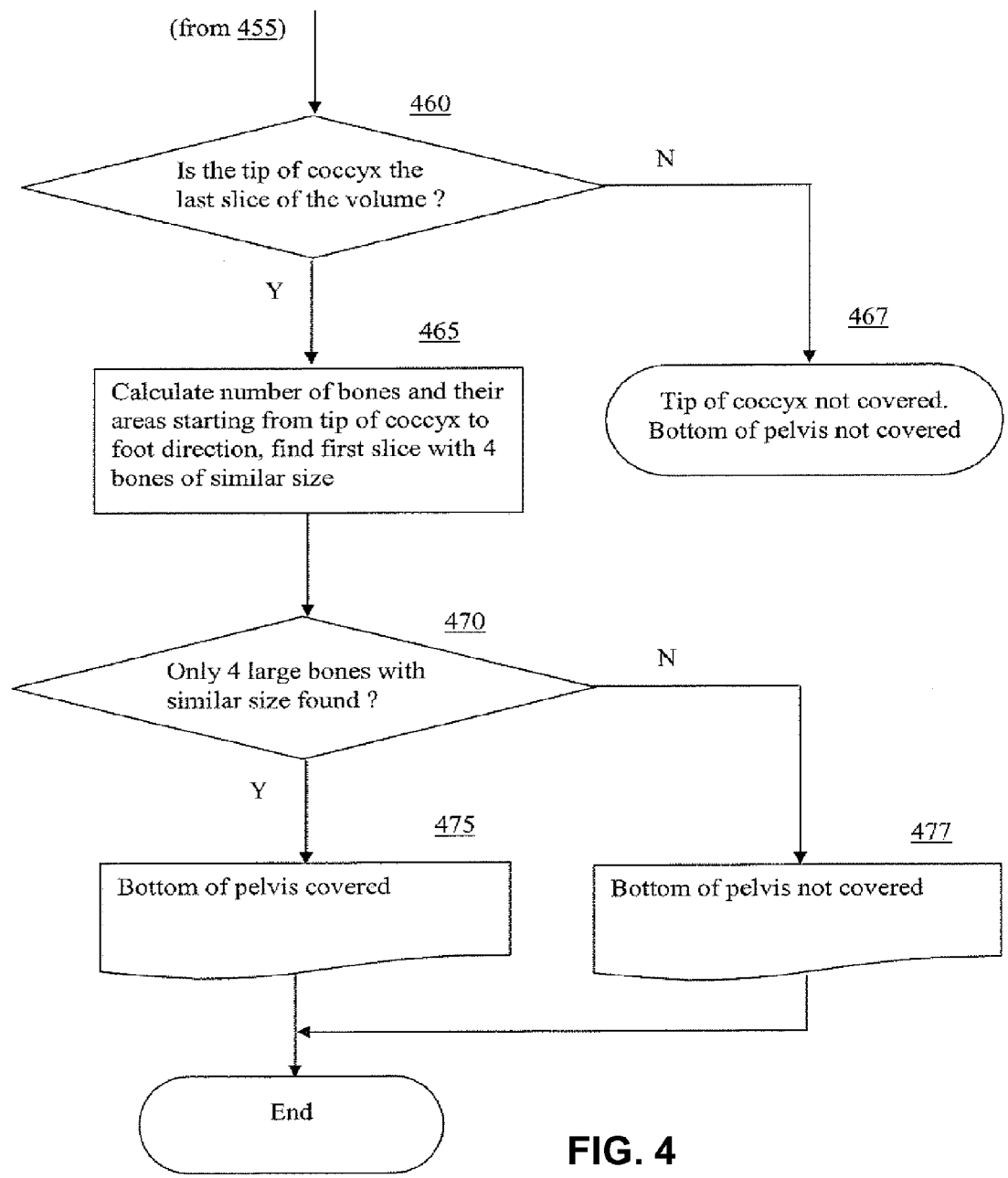

According to some embodiments of the disclosed techniques, a procedure for checking whether a cross sectional imaging scan is compliant with a pelvis scan protocol is described below in connection with FIG. 4. A CT scan is used as an example of the cross sectional imaging scan. Before the pelvis scan compliance check of a CT scan, chest compliance check (at 410) and abdomen compliance check (at 415) can be performed. A reference slice can be set to the ending slice of the abdomen if previously located, or otherwise set to the first slice of the volume (at 420).

A pelvis scan can be defined to cover the top of the iliac and the bottom of pubic symphysis. If a check for abdomen coverage has not been previously performed for the body volume, such a check can be performed to locate the top of iliac crest (at 425). If the top of iliac crest is covered in the body volume, the procedure checks the areas on both of the left and right iliac from the top iliac slice toward the head direction (at 440). If both the top of the left and right iliac crest are found (at 450), the topmost slice of the left and right iliac can be recorded (at 450); otherwise the procedure can report that iliac top slice is not covered (at 460). If the top of iliac crest is not found (at 430), the procedure can record as such and proceed with checking bottom of the pelvis below. It is customizable whether to further check the coverage of the bottom of the pelvis when the top of the pelvis is not covered.

The reference slice can be set to be one of the following anatomic markers in the following order: the top of the iliac if it is found, the ending of the lowest chest rib if it is detected, or the bottom of the lung if it is found. If none of these markers is found, the first slice in the body volume can be used as the reference slice.

The procedure of finding the tip of coccyx (at 455) can be outlined as follows. The largest component (torso) above a threshold (e.g. −700 HU) on the reference slice can be extracted, holes can be filled, and the component can be eroded with a ball of a radius of 10 pixels to remove the skin. The component(s) above −10 HU and larger than 100 pixels in the torso can be extracted and the convex hull of the component(s) can be extracted as the torso without subcutaneous fat. Let the coordinate of the top-left corner of the rectangle that encloses the torso without fat be (left, top), and the bottom-right corner of the rectangle be (right, bottom). A cubic VOI that covers the center bottom region (e.g., top-left corner (left*0.7+right*0.3, 0.25*top+0.75*bottom) and bottom right corner (left*0.3+right*0.7, bottom+20)) from the reference slice to the last slice in the body volume can be investigated. The VOI can be thresholded using a threshold of 200 HU. The largest component in the VOI can be extracted as the spine. If the spine ends (the coccyx position) in the slice that is above the last slice of the body volume (at 460), the tip of the coccyx can be determined covered (at 465). Otherwise, the procedure can report that the bottom of the pelvis is not covered (at 467).

At the center slice of the pubic symphysis, there are four large bones, two femurs and two pubis bones. The bone objects (connected components having densities greater than e.g., 200 HU and size greater than e.g., 100 pixels) can be segmented using a threshold, e.g., 200 HU, slice by slice starting from the tip of the coccyx towards the ending slice in the body volume. Regions less than 200 pixels can be removed. If the number of the bone objects in a slice is four (4) and if area1/area4<3, area1/area2<2, and area3/area4<2 (area1 to area4 are areas of the 4 bone objects, respectively) (at 465 and 470) can be simultaneously satisfied given that area1>=area2>=area3>=area4, the slice can be the bottom of pubic symphysis, and the procedure can report that the bottom of the pelvis is covered (at 475). Otherwise if the last slice of the body volume is reached and no slice satisfies the above criteria, the procedure reports that the bottom of the pelvis is not covered (at 477).

For evaluating whether a cross sectional imaging scan is compliant with a scan protocol that involves a contiguous body region larger than the chest, abdomen or pelvis individually, for example, chest-abdomen scan, abdomen-pelvis scan, and chest-abdomen-pelvis scan, the lower and upper boundary of the relevant regions can be chosen accordingly. For example, a proper chest-abdomen scan can be defined as covering the body region from the top of the lung to the top of the iliac. For such "composite" body region, the procedure outlined above for the constituent body regions can be applied in tandem for a given body volume, but steps other than for locating the upper and lower boundaries of the composite regions can be optionally omitted.

It is appreciated that the different series of images in a cross sectional imaging scan, such as a CT scan, can be performed with different contrast (e.g., one with contrast and another without contrast). For example, referring back to FIG. 1, Series #1 can represent images that are obtained when the subject is not administered a contrast agent, and Series #2 and #3 can represent images that are obtained after the subject is administered a contrast agent, e.g., at different times after the subject is administered a contrast agent. Accordingly, in another aspect of the disclosed subject matter, a method of determining whether a series of images in a cross sectional imaging scan of a subject is performed with or without contrast is provided. The method can include: (a) obtaining a series of images from a cross sectional imaging scan of a subject with or without contrast, wherein the series of cross sectional imaging images are determined to cover the chest and/or the abdomen of the subject; (b) locating a center line of the descending aorta from the series of images within a volume of interest predefined for the descending aorta of the subject; (c) generating a tubular volume approximating a portion of the descending aorta by dilating the located center line of the descending aorta with a predefined structuring element; (d) calculating the average pixel density of the tubular volume; and (e) comparing the calculated average density with a predetermined threshold, thereby determining whether the series of images are contrast enhanced. It is noted that for determining whether a cross sectional imaging scan include a series of images that are performed with contrast, the detection procedure is based on the individual series of images rather than the aggregation or combination of multiple series of images. For a cross sectional imaging scan that includes more than one series of images, each of the series can be determined with respect to contrast individually. For example, for abdominal protocols, the disclosed contrast-compliance check techniques can help determine if a cross sectional imaging scan contains tri-phase image series.

Prior to analyzing the contrast enhancement of an image series, a preliminary check can be made to determine if the specified body part is covered by the series using the techniques described above regarding body coverage compliance checks. In this regard, the contrast compliance checking procedure can be a subsequent and additional procedure following the relevant body coverage compliance checks. For example, a chest scan and/or an abdomen scan compliance check can be first performed to confirm that the image series covers the body region of interest. If the image series fails to pass the body coverage compliance check, the procedure can exit, and desirably with an indicator that the scan does not cover sufficient body part for the subsequent check of contrast enhancement. Otherwise, the image series can undergo further analysis as follows.

In some embodiments, contrast check can be based on the average pixel density of the descending aorta as the blood flowing through the descending aorta provides a good proxy for monitoring the effect of a contrast agent administered to the subject. In these embodiments, the method can include extracting a portion of aorta from the image series, or generating a tubular volume to approximate the portion of aorta. The tubular volume can be generated by first locating a center line of the descending aorta in a defined volume of interest (VOI), and dilating the center line with a predefined structuring element. The center line can be determined by a shortest path method, in which the VOI can be viewed as a graph with voxels as vertices and edges for every two neighboring voxels in 6-connected neighborhood (e.g., 4 neighbors in the image slice, 1 above and 1 below in the two adjacent slices; 18- and 26-connected neighborhood can also be used). For each edge a weight (cost) is assigned. Assigning the weight/cost is further described below. The center of the aorta can be determined as the path from the first slice to the last slice in the VOI having the smallest accumulative edge cost. The average pixel density of the tubular volume (e.g., the pixel density of the image slices circumscribed by the tubular volume) approximating the aorta can be calculated and compared with a predefined threshold. If the average density is greater than the predefined threshold (e.g., 60 HU), or a threshold determined from an average density of or other objects or interest, e.g., one or more organs, within the series of images, the image series can be considered to be contrast enhanced; otherwise, it can be considered as not contrast enhanced. The determined enhancement status of the image series can then be compared with a reported contrast enhancement status for the image series to evaluate whether the image series is in compliance with a protocol under which the cross sectional imaging scan is performed.

A rectangular region in the axial (i.e., x-y) plane and its extent along the z-axial direction can be defined as the aorta VOI. For a chest scan, the z-axial dimension is from the center of the chest to the bottom of chest. Spine can be extracted by thresholding, labeling and connected component analysis because of its high density and center posterior location. The top left corner of the rectangle region in the x-y plane can be (xSpine−2*Radius, ySpine−5*Radius), and the width and height of the rectangle can be selected as 5*Radius and 7*Radius respectively, where xSpine, ySpine and Radius are the center and radius of the largest inscribed circle in the spine. For an abdomen scan, the z extents can be from the top of the liver to the bottom of the lowest chest ribs. The top left corner of the rectangle region can be (xSpine−2*Radius, ySpine−6*Radius), and the width and height of the rectangle can be 6*Radius and 7*Radius, respectively. The value of the above parameters can be modified as appropriate.

For each slice, Canny edge detector can be applied to yield a binary edge image. A Hough transformation can then be employed to generate an accumulation image in which the pixel value is the number of the points at a predefined fix-sized circle centered at that pixel. If the pixel value of the accumulation image is small (e.g., less than 75 percent of the maximum value of the accumulation image), it can be set to 0. Since the radius of the aorta varies from person to person and from slice to slice in the same person, several circle radii can be predefined. The radii for Hough transform can cover the range of the aorta radii (e.g., for chest from 18 to 21 pixels; for abdomen from 9 to 18 pixels). This can generate several candidate images for each slice in the aorta VOI. The value of each pixel in the final accumulation image can be taken as the maximum value among the values of the corresponding pixels in all candidate images. The values of the accumulation image pixels can then be multiplied by −1. A distance transform can be then applied to the accumulation image, assigning each pixel (x,y) a value NewValue(x,y) which is the minimum of the distance of the pixel to a center point (xcenter,ycenter) plus the value of that center point AccumIm(xcenter,ycenter), i.e., NewValue(x,y)=min{dist((x,y),(xcenter,ycenter))+AccumIm(xcenter,ycenter), for all AccumIm(xcenter, ycenter) not=0}. The smallest value of the distance image can be set to 0 by subtracting the smallest value of the image from each pixel value. This volume of the distance images can be called CircleCost.

A threshold operation can be applied to the aorta VOI to extract vessel candidates that can be defined to be regions whose densities are larger than 10 HU. The greatest inscribed circle in the spinal cord can be removed from the VOI. To check contrast enhancement for a chest image series, another high density object, the heart, can also be roughly segmented and removed from the first slice in the VOI. To identify and segment the heart, objects whose densities greater than 100 HU can be extracted and holes in the objects are filled. The objects can then be morphologically opened by a ball element with a radius of 40 pixels. The largest object can be recognized as the heart and removed from the image. After removing the heart and the majority of the spine, the distance transform can be applied to calculate the distance of each candidate pixel to the nearest background. The resulting volume can be called Dist. Pixels close to the boundary can be punished by an exponential function. The DistTerm(p) for pixel p can be defined as DistTerm(p)=1 if Dist[p]>=8, otherwise DistTerm(p)=exp((Dist[p]−8)*(Dist[p]−8)).

The edge weight (cost) for moving from point p to its neighbor point q can be defined as a function of their pixel values, distance and relative positions. Moving backward from slice N to its previous slice N−1 is not allowed. Therefore, the weight is infinity when point q is on a slice that is above the slice in which point p resides. If the pixel value of q is smaller than a given threshold, e.g., 10 HU, the weight from p to q can also be defined as infinity. In one example, the cost for moving from p to q can be defined as:

Weight(p−>q)=ImgTerm(p,q)*DistTerm(p)*
DistTerm(q)*(CircleCost[p]+CircleCost[q])*K where ImgTerm(p, q)=exp((I[p]−I[q])*(I[p]−I[q])/200), I[p] is the density (Hounsfield Unit) at pixel p K=1 if p and q are in the same slice. Otherwise, K=zspacing/xspacing, where xspacing is the image resolution in the axial plane and zspacing is the resolution along the z-axial direction (the distance between the center of two adjacent slices).

The weight assigned as above punishes a move from a pixel to a neighboring pixel that is different in density, close to background or far away from a center of a candidate circle for the aorta. It favors moves within a plane than between planes if spacing in z direction is larger than spacing in axial plane.

An artificial source point can be deemed to exist above the first slice of the aorta VOI and so is an edge between the source point and each vessel candidate point on the first slice with a weight of zero (0). Similarly, an artificial sink point can be considered to exist below the last slice of the aorta VOI that connects each vessel candidate point on the last slice with a weight of zero (0). The center line of the aorta can be defined as the shortest path from the source to the sink point.

The disclosed techniques can work for images with contrast and without contrast. The center line can be dilated with a ball with a radius of several pixels (e.g., 6 pixels), generating a tubular volume centering axially around the center line. The average density of the tubular volume on the first slice or the average density of the entire tubular volume can be compared with a predetermined threshold, e.g., 60 HU, to determine whether the images series is enhanced.

As noted above, a series of images can include more than one sub-series, where one sub-series can be obtained from a portion of a scan session performed without contrast, and another sub-series obtained from the portion of a scan session performed with contrast. For such cases, a contrast compliance check can be performed separately on each sub-series of images. Such separate contrast compliance checks can be further to, or include checking the appropriate body coverage for each sub-series.

For an abdominal study, it can be further determined if a series with contrast is at arterial or portal venous phase by comparing the average densities of the aorta and liver parenchyma. Liver parenchyma segmentation can be first applied, and a classifier can be trained to differentiate the artery and portal phase based on the average densities of the aorta and the liver parenchyma. A linear classifier can work well. If a contrast enhanced series satisfies Mean(aorta)−0.5*Mean (liver)>0, it can be classified as the arterial phase images. Other classifiers can also be trained to separate arterial phase from portal venous phase.

In another aspect of the disclosed subject matter, a system for performing the operations of the techniques described above is provided. Collectively, these operations (many of which involve digital image manipulation) can be carried out by a processing arrangement configured to perform the operations, e.g., by executing one or more computer programs, herein referred to as the "CT compliance check application." The application can be implemented as a software component of a suitable hardware platform, for example, a standalone computer, a networked computer, a network server computer, or the like, using appropriate software development tools available for the respective hardware platforms. The application can be internet-enabled, for example, the application can receive images of cross sectional imaging scans over the internet, and perform the various operations either locally or remotely, and transmit the results of the compliance check(s) through the internet to a remote location. The images of cross sectional imaging scans can be retrieved from a database externally linked to the application, for example, through a database connectivity tool, or any other suitable database access protocol.

The processing arrangement can include one or more electronic computing devices operable to receive, process, and store image data and other data associated with cross sectional imaging scans. For example, the processing arrangement can include one or more general-purpose standalone or networked personal computers, work stations, supercomputers, and include one or more processors and memory devices coupled with the one or more processors. The system can also include input and output devices for receiving data and information and displaying or otherwise presenting results of the operations. Both the input devices and output devices may include fixed or removable storage media such as a magnetic computer disk, CD-ROM, or other suitable media operable to both receive input from and provide output to a user of the system. Additionally, the system may include any suitable combination of software, firmware, and hardware. As previously noted, the various features and aspects as previously described with respect to the methods of the disclosed subject matter likewise can be incorporated in the systems herein.

The disclosed subject matter is not to be limited in scope by the specific embodiments described herein. Various modifications of the disclosed subject matter in addition to those described herein will become apparent to those skilled in the art from the foregoing description and the accompanying figures. Such modifications therefore fall within the scope of the appended claims.

The invention claimed is:

1. A method comprising: storing on a computer readable memory, first data that indicates predetermined criteria for scan data to be compliant with a protocol to cover an organ of interest with correct intravenous contrast agent; obtaining, using one or more computer processors, a cross sectional imaging scan including one or more series of cross sectional images previously collected for a subject; determining, using one or more computer processors, one or more body volumes covered by the cross sectional imaging scan, wherein each of the one or more body volumes covers a continuous region along a body axis of the subject; for each of the determined one or more body volumes, locating, using one or more computer processors, a presence of at least a portion of one or more internal organs of the subject encompassed in a corresponding determined volume; and verifying, using one or more computer processors, whether the cross sectional imaging scan is compliant with the protocol based on the first data and based on the portion of one or more internal organs of the subject encompassed in the corresponding determined body volume.

2. The method of claim 1, wherein determining the one or more body volumes comprises arranging the one or more series of images according to the axial location of each of the one or more series of images with respect to the body of the subject.

3. The method of claim 1, wherein locating the presence of at least a portion of one or more internal organs for a determined body volume comprises selecting a working set of images for the body volume based on the one or more series of images included in the cross sectional imaging scan.

4. The method of claim 3, wherein selecting the working set of images comprises subsampling the one or more series of images according to predetermined axial locations in the body volume.

5. The method of claim 1, wherein the predetermined criteria are for a scan of one or more body regions of the subject, selected from the group consisting of a chest scan, an abdomen scan, a pelvis scan, a chest-abdomen scan, an abdomen-pelvis scan, and a chest-abdomen-pelvis scan.

6. The method of claim 1, wherein when there is more than one body volume determined, the locating of the presence of at least a portion of one or more internal organs of the subject is performed according to the relative axial positions of the body volumes, with the volume nearest the head of the subject first.

7. The method of claim 3, wherein the predetermined criteria include body coverage criteria for a chest scan under which the one or more internal organs include a lung of the subject, and wherein locating the presence of at least a portion of a lung for a determined body volume includes identifying the largest lung-intensity object as the lung in the determined body volume.

8. The method of claim 3, wherein the predetermined criteria include body coverage criteria for a chest scan under which the one or more internal organs include a lung of the subject, and wherein locating the presence of at least a portion of the lung includes detecting the presence or position or both of the apex of the lung and the bottom of the lung.

9. The method of claim 8, wherein detecting the presence or position or both of the apex of the lung is based on the axial position of the first image in the working set of images that has a lung-intensity object and the size of the lung-intensity object in the area of the image that excludes the trachea of the subject.

10. The method of claim 8, wherein detecting the presence or position or both of the bottom of the lung is based on the axial position of the last image in the working set of images having a lung-intensity object as compared with the last image in the working set of images of the body volume encompassing the lung.

11. The method of claim 3, wherein the predetermined criteria include body coverage criteria for an abdomen scan under which the one or more internal organs include the liver of the subject, and wherein locating the presence of at least a portion of the liver in the determined body volume includes detecting the presence or position or both of the top of the liver, wherein the detecting is based on the selected working set of images for the body volume.

12. The method of claim 11, wherein locating the presence of at least a portion of the liver comprises detecting one of the top of the iliac crest and the bottom of the chest ribs.

13. The method of claim 3, wherein the predetermined criteria include body coverage criteria for a pelvis scan under which the top of the iliac crest is selected as an upper boundary and the bottom of pubic symphysis is selected as a lower boundary.

14. The method of claim 13, wherein locating the presence of the top of the iliac crest comprises locating a topmost slice of the left iliac crest and the right iliac crest.

15. The method of claim 13, wherein locating the presence of the bottom of pubic symphysis comprises locating the tip of coccyx followed by locating four bones on a slice in the body volume with similar size from the tip of coccyx toward the foot direction of the subject.

16. The method of claim 3, wherein the predetermined criteria include body coverage criteria for an chest-abdomen scan, and wherein locating the presence of at least a portion of one or more internal organs in the determined body volume includes detecting the presence or position or both of the top of the lung and the presence or position or both of the top of the iliac crest of the subject.

17. The method of claim 3, wherein the predetermined criteria include body coverage criteria for an abdomen-pelvis scan, and wherein locating the presence of at least a portion of one or more internal organs in the determined body volume includes detecting the presence or position or both of the top of the liver and the presence or position or both of the bottom of the pubic symphysis of the subject.

18. The method of claim 3, wherein the predetermined criteria include body coverage criteria for an chest-abdomen-pelvis scan, and wherein locating the presence of at least a portion of one or more internal organs in the determined body volume includes detecting the presence or position or both of the top of the lung and the presence or position or both of the bottom of the pubic symphysis of the subject.

19. The method of claim 1, the predetermined criteria further comprising:
the cross sectional imaging scan is performed after intravenous application of a contrast agent.

20. The method of claim 19, wherein:
locating a presence of at least a portion of one or more internal organs of the subject further comprises generating a tubular volume approximating a portion of the descending aorta of the subject falling within a predefined volume of interest and
verifying whether the cross sectional imaging scan is compliant further comprises comparing pixel density of the tubular volume with a predetermined threshold associated with intravenous application of the contrast agent.

21. The method of claim 20, wherein when at least one series of images included in the cross sectional imaging scan is determined to cover the chest or the abdomen or both chest and abdomen, the generating of the tubular volume comprises:
locating a center line of the descending aorta from the at least one series of the images within a predefined volume of interest for the descending aorta of the subject; and
generating the tubular volume by dilating the located center line of the descending aorta with a predefined structuring element.

22. The method of claim 21, wherein locating the center line of the descending aorta comprises treating the volume of interest (VOI) encompassing the portion of the descending aorta as a directed graph including voxels in the VOI as vertices and edges between neighboring voxels, wherein each edge of the directed graph is assigned a cost, and wherein the center line of the descending aorta is determined to be the path from the first slice in the volume of interest to the last slice in the volume of interest that has the smallest accumulative edge cost.

23. The method of claim 22, wherein when the cross sectional imaging scan is determined to cover abdomen and at least one series of images of the cross sectional imaging scan is determined to be performed with contrast, the method further comprises determining whether the at least one series of images is at arterial or portal venous phase based on comparing the average pixel density of the descending aorta and the average pixel density of the liver parenchyma of the subject.

24. A system comprising a processing arrangement including one or more computer processors, the processing arrangement configured to: store on a computer readable memory, first data that indicates predetermined criteria for scan data to be compliant with a protocol to cover an organ of interest with correct intravenous contrast agent; obtain a cross sectional imaging scan including one or more series of cross sectional images previously collected for a subject; determine one or more body volumes covered by a cross sectional imaging scan, wherein each of the one or more body volumes covers a continuous region along a body axis of the subject; for each of the determined one or more body volumes, locate a presence of at least a portion of one or more internal organs of the subject encompassed in a corresponding determined body volume; and verify whether the cross sectional imaging scan is compliant with the protocol based on the first data and based on the portion of one or more internal organs of the subject encompassed in the corresponding determined body volume.

25. The system of claim 24, wherein the predetermined criteria further comprises the cross sectional imaging scan is performed after intravenous application of a contrast agent.

26. The system of claim 25, wherein:
locating a presence of at least a portion of one or more internal organs of the subject further comprises generating a tubular volume approximating a portion of the descending aorta of the subject falling within a predefined volume of interest; and
verifying whether the cross sectional imaging scan is compliant further comprises comparing pixel density of the tubular volume with a predetermined threshold associated with intravenous application of the contrast agent.

* * * * *